United States Patent
Ericsson

(10) Patent No.: US 8,616,109 B2
(45) Date of Patent: Dec. 31, 2013

(54) PAIR OF SAW BLADES

(75) Inventor: Hans Ericsson, Färjestaden (SE)

(73) Assignee: Indocean Diamond Tools Limited, Cybercity, Ebene (MU)

( * ) Notice: Subject to any disclaimer, the term of this patent is extended or adjusted under 35 U.S.C. 154(b) by 955 days.

(21) Appl. No.: 10/477,429

(22) PCT Filed: May 16, 2002

(86) PCT No.: PCT/SE02/00930
§ 371 (c)(1),
(2), (4) Date: Apr. 19, 2004

(87) PCT Pub. No.: WO02/092298
PCT Pub. Date: Nov. 21, 2002

(65) Prior Publication Data
US 2004/0182217 A1   Sep. 23, 2004

(30) Foreign Application Priority Data
May 16, 2001  (SE) ........................................ 0101714

(51) Int. Cl.
*B27B 33/14*  (2006.01)
(52) U.S. Cl.
USPC ................... 83/835; 83/837; 83/666; 83/838
(58) Field of Classification Search
USPC .................. 83/664, 837, 666, 835, 846, 838; 30/347, 369; 144/218–241
See application file for complete search history.

(56) References Cited

U.S. PATENT DOCUMENTS

|   |   |   |   |   |
|---|---|---|---|---|
| 588,082 A | * | 8/1897 | Perkins | 144/222 |
| 1,770,240 A | * | 7/1930 | Magnuson | 606/176 |
| 2,555,428 A | * | 6/1951 | Tuttle | 30/369 |
| 2,592,382 A | * | 4/1952 | Blais | 407/31 |
| 3,708,129 A |   | 1/1973 | Nowak |   |
| 3,927,447 A |   | 12/1975 | Willinger |   |

(Continued)

FOREIGN PATENT DOCUMENTS

| FR | 2192483 | * | 1/1974 | B27B 9/00 |
|---|---|---|---|---|
| FR | 2192483 |   | 2/1974 |   |
| JP | 10118838 A | * | 5/1998 | B23D 45/16 |
| WO | WO 86/02590 | * | 5/1986 | B27B 1/00 |

OTHER PUBLICATIONS

Office Action for corresponding U.S. Appl. No. 12/662,729 dated Jun. 25, 2010.

*Primary Examiner* — Omar Flores Sanchez
(74) *Attorney, Agent, or Firm* — Harness, Dickey & Pierce P.L.C.

(57) ABSTRACT

A pair of saw blades comprises a first blade (1), which is adapted to rotate in a first direction about an axis of rotation (r), and a second blade (2), which is adapted to rotate in a second direction opposite to said first direction about the same axis of rotation (r), wherein each blade (1, 2) has a blade body (3, 4) and cutting elements (5, 6), which are provided along the periphery of the blade body (3, 4) and adapted to run close and in parallel to each other when the blades (1, 2) are rotating. A spacer means (7), which extends into a space between the two blades (1, 2), is attached to at least the blade body (4) of one of the blades (2) in order to support itself against and slide along a peripheral part of the other opposite blade (1).

20 Claims, 1 Drawing Sheet

(56) References Cited

U.S. PATENT DOCUMENTS

| | | | |
|---|---|---|---|
| 4,584,770 A * | 4/1986 | Sabol | 30/267 |
| 4,605,933 A * | 8/1986 | Butscher | 343/700 MS |
| 4,632,162 A | 12/1986 | Angeloni | |
| 4,784,029 A * | 11/1988 | Gebelius | 83/13 |
| 5,031,324 A * | 7/1991 | Berghauser et al. | 30/369 |
| 5,104,744 A * | 4/1992 | Haas | 428/596 |
| 6,082,238 A * | 7/2000 | Zelt, III | 83/664 |
| 6,135,004 A * | 10/2000 | Gebelius | 83/835 |
| 6,962,147 B2 * | 11/2005 | Hamilton | 125/13.01 |
| 7,013,784 B2 * | 3/2006 | Lowder et al. | 83/848 |
| 2003/0000363 A1 * | 1/2003 | Hofmann et al. | 83/837 |

* cited by examiner

PAIR OF SAW BLADES

TECHNICAL FIELD

The present invention concerns a pair of saw blades comprising a first blade, which is adapted to rotate in a first direction about an axis of rotation, and a second blade, which is adapted to rotate in a second direction opposite to said first direction about the same axis of rotation, wherein each blade has a blade body and cutting elements, which are arranged along the periphery of the blade body and adapted to run close and in parallel to each other when the blades are rotating.

STATE OF THE ART

In order to render cooperation possible of two saw blades according to the preamble it is vital that a gap exists between their blade bodies. Traditionally this gap is created by turning down the adjacent sides of the blade bodies relatively to the periphery with the cutting elements, so that a circumferential ring is left along the periphery. This ring comprises both an unturned part of the blade body as well as said cutting elements.

DRAWBACKS OF THE STATE OF THE ART

One drawback of the state of the art is that one when turning down must pay attention to that the lathe tool does not contact the cutting elements, because that might damage either the lath tool or the cutting elements. Furthermore the turning can give rise to stresses in the saw blade. Another drawback with the state of the art is that one when optionally grinding the cutting elements must avoid contact between the grinding disc and the blade body, because one otherwise risks clogging of the grinding disc by the relatively soft material of the blade body.

THE OBJECT OF THE INVENTION

Against that background the object of the invention is to improve a pair of saw blades according to the preamble in such a way that the drawbacks of the state of the art are obviated.

SUMMARY OF THE INVENTION

According to the invention this is achieved in a pair of saw blades according to the preamble in that a spacer means, which extends into a space between the two blades, is attached to at least the blade body of one of the blades in order to support itself against and slide along a peripheral part of the other opposite blade.

By attaching a spacer means on the blade body of at least one of the blades it is made possible in an easy way to provide the necessary gap without having to turn down the main blade bodies. Furthermore the spacer means leads to the whole main blade body lying on a level with regard to the face of the saw blade beneath the cutting elements, so that these can be machined without the blade body being affected thereby.

According to one embodiment of the invention the cutting elements are saw teeth made of hard metal, the spacer means preferably comprising a part of the saw teeth of said one blade, said part being prolonged in a direction towards the rotational axis of that blade.

This solution is very easy to achieve and does not require more measures than such saw teeth do require normally, i.e. soldering onto the blade body and subsequent grinding of the saw teeth.

According to another embodiment of the invention the cutting elements are diamond clad segments.

In this context segments include both segments that are distinctly separated from each other by incisions in the periphery of the blade bodies as well as segments defined by trenches in the diamond cladding itself.

According to an embodiment especially suiting the solution with the diamond clad segments but of course even suiting the solution with the saw teeth the spacer means comprises at least one strip part, which is cemented onto the blade body of said one blade symmetrically with regard to the rotational axis of that blade.

The advantage of this solution is that it is very easy to achieve and that it renders possible the use of a plurality of materials for the strip part, such as sheet metal, plastics or ceramics.

According to a further embodiment of the invention the spacer means comprises at least one strip part, which is cemented onto the main blade of said one blade symmetrically with regard to the rotational axis of that blade.

The advantage of this solution is that it is very easy to accomplish and that it is well suited for cost-effective mass production.

BRIEF DESCRIPTION OF THE DRAWING

Preferred embodiments of the invention will be described in the following with reference to the accompanying drawing, wherein.

DESCRIPTION OF THE THREE EMBODIMENTS

Figure 1:
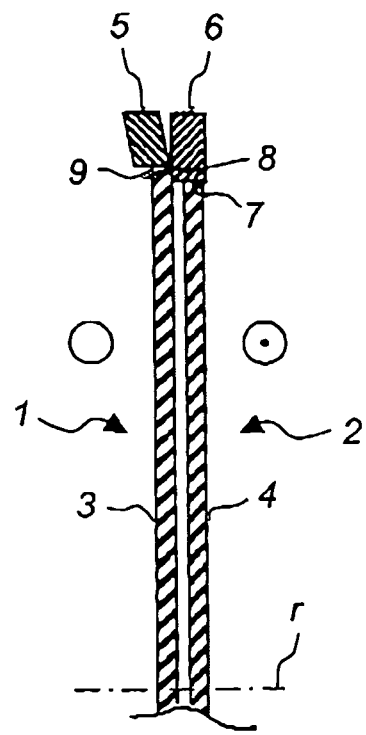
FIG. 1 is a cross-sectional view showing a part of a pair of saw blades according to a first embodiment of the invention.

The pair of saw blades in FIG. 1 is provided for sawing wood and metal and comprises two blades 1, 2. Of these the first one is arranged to rotate about an axis of rotation r in a first direction, in this case towards the drawing surface, which is indicated by an empty ring. The other one of the two blades is arranged to rotate about the same axis of rotation in a second direction opposite to said first direction, i.e. out of the drawing surface, which is indicated by a ring with a dot in its centre.

Both saw blades 1, 2 have a blade body 3, 4, which is made of steel sheet and extends to the periphery of the blades. Along the periphery both blades have saw teeth made of hard metal, the saw teeth 6 of the second blade 2, as can be seen, having in the direction towards said axis of rotation r a prolonged part 7 compared to the saw teeth of the first blade.

Like the saw teeth 5, 6 the part 7 is ground in a suitable way, which means that said part 7 is surfaced, so that a smooth bearing surface 8 is created for the peripheral blade body portion 9 of the opposing first saw blade 1, the height of the bearing surface 8 above the blade body of the second blade 4 being chosen in such a way, that the blade bodies 3, 4 of both blades 1, 2 keep a desired distance when the bearing surface 8 abuts the blade body 3 of the first blade.

Figure 2:
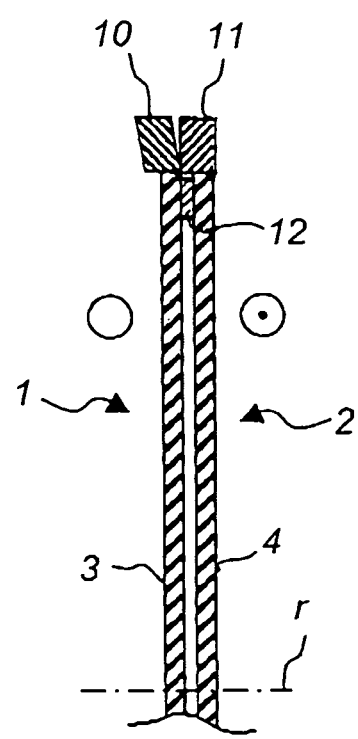
FIG. 2 is a cross-sectional view showing a part of a pair of saw blades according to a second embodiment of the invention.

Like the embodiment in FIG. 1 the embodiment in FIG. 2 concerns a pair of saw blades 1, 2 provided for sawing wood and metal. It is shown in the same manner as the embodiment in FIG. 1 and therefore only the difference between the embodiments is raised in the following.

The difference lies in that the saw teeth 10, 11 of the two blades 1, 2 are equally long and that instead of a prolonged portion of the saw teeth of the second blade 2 separate strip pieces 12 are arranged along the periphery of the blade body 4 of this blade 2. These strip pieces 12 are suitably made of metal, such as stainless steel, but even other materials, such as plastics or ceramics, are possible.

Figure 3:
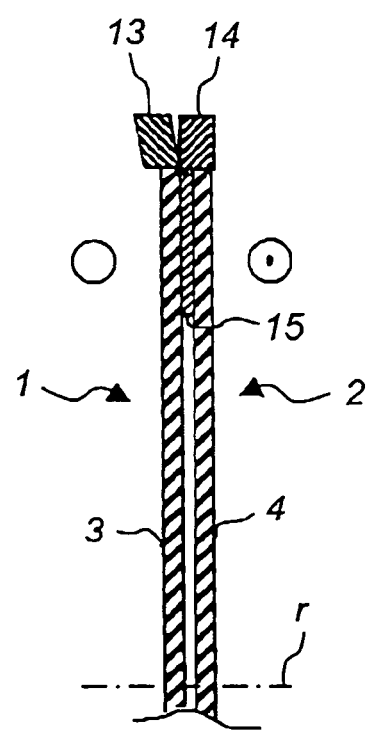
FIG. 3 is a cross-sectional view showing a part of a pair of saw blades according to a third embodiment of the invention.

Like the embodiments in FIGS. 1 and 2 the embodiment in FIG. 3 concerns a pair of saw blades 1, 2 provided for sawing wood and metal. It is also shown in the same way as the embodiment in FIG. 1 and therefore only the difference between the two embodiments is raised in the following.

The difference lies in that the saw teeth 13, 12 of the two blades 1, 2 (as with the embodiment in FIG. 2) are equally long and that instead a prolonged portion at the saw teeth of the second blade a surface coating portion 15 is applied along the periphery of the blade body of this blade 2. The surface coating portion 15 can be a solvent based layer, a layer of a two-component material or a layer applied in a electrolytic way, such as NEDOX, which is sufficiently durable for the purpose and sufficiently hard to ensure that the blade bodies 3, 4 of the two blades 1, 2 keep the correct distance from each other.

It is obvious that the embodiments of the saw blades 1, 2 described above can be altered in different ways within the scope of the claims. Thus, it is possible to arrange the spacer means mentioned in the claims on both blades and to use blades with other cutting elements than saw teeth of hard metal.

The invention claimed is:

1. A pair of saw blades, comprising:
    a first blade, adapted to rotate in a first direction about an axis of rotation;
    a second blade, adapted to rotate in a second direction opposite to said first direction about the same axis of rotation, wherein each blade has a blade body and cutting elements, arranged along the periphery of the blade body and adapted to run close and in parallel to each other when the blades are rotating; and
    a spacer, extending into a space between the two blades and attached to at least the blade body of one of the blades at a peripheral part thereof in order to support itself against and slide about the axis of rotation along a peripheral part of the other blade.

2. The pair of saw blades according to claim 1, wherein the cutting elements are saw teeth made of hard metal.

3. The pair of saw blades according to claim 2, wherein the spacer comprises a part of saw teeth of said one blade, said part being prolonged in a direction towards the axis of rotation of that blade.

4. The pair of saw blades according to claim 1, wherein the cutting elements are diamond clad segments.

5. The pair of saw blades according to claim 1, wherein the spacer comprises at least one strip part, cemented onto the blade body of said one blade symmetrically with regard to the axis of rotation of said one blade.

6. The pair of saw blades according to claim 4, wherein the strip part is made of sheet metal.

7. The pair of saw blades according to claim 4, wherein the strip part is made of plastics.

8. The pair of saw blades according to claim 4, wherein the strip part is made of ceramics.

9. The pair of saw blades according to claim 1, wherein the spacer comprises at least a surface coating part, applied onto the blade body of said one blade symmetrically with regard to the axis of rotation of said one blade.

10. The pair of saw blades according to claim 2, wherein the spacer comprises at least one strip part, cemented onto the blade body of said one blade symmetrically with regard to the axis of rotation of said one blade.

11. The pair of saw blades according to claim 4, wherein the spacer comprises at least one strip part, cemented onto the blade body of said one blade symmetrically with regard to the axis of rotation of said one blade.

12. The pair of saw blades according to claim 11, wherein the strip part is made of sheet metal.

13. The pair of saw blades according to claim 11, wherein the strip part is made of plastics.

14. The pair of saw blades according to claim 11, wherein the strip part is made of ceramics.

15. The pair of saw blades according to claim 2, wherein the spacer comprises at least a surface coating part, applied onto the blade body of said one blade symmetrically with regard to the axis of rotation of said one blade.

16. The pair of saw blades according to claim 1, wherein the spacer comprises at least a surface coating part, applied onto the blade body of said one blade symmetrically with regard to the axis of rotation of said one blade.

17. A pair of saw blades, comprising:
    a first blade, adapted to rotate in a first direction about an axis of rotation;
    a second blade, adapted to rotate in a second direction opposite to said first direction about the same axis of rotation, wherein each blade includes a blade body and cutting elements, arranged along the periphery of the blade body and adapted to run proximate to each other when the blades are contra-rotating; and
    a spacer, extending into a space between the two blades, for attaching to at least the blade body of one of the blades at a peripheral part thereof and for sliding about the axis of rotation along a peripheral part of the other blade.

18. The pair of saw blades according to claim 17, wherein the cutting elements include saw teeth made of hard metal.

19. The pair of saw blades according to claim 18, wherein the spacer includes a part of saw teeth of said one blade, said part being prolonged in a direction towards the axis of rotation of that blade.

20. The pair of saw blades according to claim 17, wherein the cutting elements include diamond clad segments.

* * * * *